(12) United States Patent
Nabeto et al.

(10) Patent No.: US 11,931,887 B2
(45) Date of Patent: Mar. 19, 2024

(54) END EFFECTOR DEVICE

(71) Applicant: OMRON Corporation, Kyoto (JP)

(72) Inventors: Misato Nabeto, Kyoto (JP); Sayaka Doi, Joyo (JP); Hiroki Koga, Nara (JP)

(73) Assignee: OMRON CORPORATION, Kyoto (JP)

( * ) Notice: Subject to any disclaimer, the term of this patent is extended or adjusted under 35 U.S.C. 154(b) by 406 days.

(21) Appl. No.: 17/273,502

(22) PCT Filed: Mar. 12, 2019

(86) PCT No.: PCT/JP2019/009906
§ 371 (c)(1),
(2) Date: Mar. 4, 2021

(87) PCT Pub. No.: WO2020/066063
PCT Pub. Date: Apr. 2, 2020

(65) Prior Publication Data
US 2021/0354316 A1    Nov. 18, 2021

(30) Foreign Application Priority Data
Sep. 26, 2018 (JP) .................. 2018-180752

(51) Int. Cl.
*B25J 15/08* (2006.01)
(52) U.S. Cl.
CPC ..................... *B25J 15/08* (2013.01)
(58) Field of Classification Search
CPC ...... B25J 15/08; B25J 15/0253; B25J 9/1633; B25J 9/1687; B25J 13/084; B25J 13/089;
(Continued)

(56) References Cited

U.S. PATENT DOCUMENTS

| 5,184,861 A | * | 2/1993 | Voellmer | ............... | B25J 15/026 |
| | | | | | 901/41 |
| 5,215,923 A | * | 6/1993 | Kinoshita | .............. | B25J 9/1612 |
| | | | | | 901/31 |

(Continued)

FOREIGN PATENT DOCUMENTS

| JP | S57205092 A | 12/1982 |
| JP | S61164735 A | 7/1986 |

(Continued)

OTHER PUBLICATIONS

EPO Extended European Search Report for corresponding EP Application No. 19865041.8; dated Apr. 22, 2022.

(Continued)

*Primary Examiner* — Stephen A Vu
(74) *Attorney, Agent, or Firm* — CANTOR COLBURN LLP

(57) ABSTRACT

The end effector device includes an end effector including a palm and a plurality of fingers, a drive device, a position shift direction determination unit and a position shift correction unit. Each finger includes a tactile sensor unit capable of detecting external forces in at least three axial directions. The position shift direction determination unit determines in which direction the object being grasped is position-shifted with respect to the fitting recess based on a detection result detected by the tactile sensor unit in a case where at least one of the external forces detected by the tactile sensor unit is a specified value or more. The position shift correction unit moves the palm in a direction opposite to a position shift direction of the object being grasped determined by the position shift direction determination unit.

18 Claims, 11 Drawing Sheets

(58) Field of Classification Search
CPC ......... B25J 13/082; G05B 2219/39532; G05B 2219/40032; G05B 2219/40625
See application file for complete search history.

(56) References Cited

U.S. PATENT DOCUMENTS

| | | | | |
|---|---|---|---|---|
| 5,335,955 | A * | 8/1994 | Pekka | B66F 9/184 |
| | | | | 294/197 |
| 5,825,980 | A * | 10/1998 | Danmoto | B25J 9/1612 |
| | | | | 700/262 |
| 8,897,918 | B2 * | 11/2014 | Goto | B25J 15/10 |
| | | | | 901/33 |
| 2016/0075030 | A1 | 3/2016 | Takahashi | |
| 2018/0104821 | A1 | 4/2018 | Takahashi | |

FOREIGN PATENT DOCUMENTS

| | | |
|---|---|---|
| JP | 2003191193 A | 7/2003 |
| JP | 2010286254 A | 12/2010 |
| JP | 2016059971 A | 4/2016 |

OTHER PUBLICATIONS

Chathuranga et al., "A soft three axis force sensor useful for robot grippers", IEEE/RSJ International Conference on Intelligent Robots and Systems (IROS); Oct. 9, 2016; pp. 5556-5563.

Van Wyk et al., "Comparative Peg-in-Hole Testing of a Force-Based Manipulation Controlled Robotic Hand", IEEE Transactions on Robotics, vol. 34, No. 2, Apr. 2018; pp. 542-549.

International Search Report for International Application No. PCT/JP2019/009906; dated Jun. 11, 2019.

PCT Written Opinion of the International Searching Authority for International Application No. PCT/JP2019/009906; dated Jun. 11, 2019.

* cited by examiner

END EFFECTOR DEVICE

CROSS REFERENCE TO RELATED APPLICATIONS

This is the U.S. national stage of application No. PCT/JP2019/009906, filed on Mar. 12, 2019. Priority under 35 U.S.C. § 119(a) and 35 U.S.C. § 365(b) is claimed from Japanese Application No. 2018-180752, filed Sep. 26, 2018, the disclosure of which is also incorporated herein by reference.

TECHNICAL FIELD

The present disclosure relates to an end effector device including an end effector with a tactile sensor unit.

BACKGROUND ART

Patent Literature 1 discloses a slide type chuck that includes a plurality of fingers, a moving unit that linearly moves each finger, a turning unit that turns the moving unit to change the moving direction, and a motor that drives the moving unit and the turning unit. The slide type chuck holds an object being grasped by moving the fingers.

CITATION LIST

Patent Literature

PTL 1: JP 2003-191193 A

SUMMARY OF INVENTION

Technical Problem

The slide type chuck has a contact detection unit that detects a contact state between the object being grasped and the fingers. When the slide type chuck performs a work of inserting a part grasped by each finger into another part, the slide type chuck controls a contact force between all the fingers and the grasped part to be uniform and matches center positions of the grasped part and another part, which enables accurate insertion operation.

However, with the slide type chuck, when the contact force between all the fingers and the grasped part is not uniform, the slide type chuck cannot correct the position shift of the grasped part, and it may take time to insert the grasped part into another part.

An object of the present disclosure is to provide an end effector device capable of correcting position shift of an object being grasped with respect to a fitting recess of an object to be assembled.

Solution to Problem

An end effector device of an example of the present disclosure includes:
an end effector including
  a palm and
  a plurality of fingers capable of grasping operation in which each of the plurality of fingers moves in a direction intersecting an extending direction thereof as well as approaching each other and grasps an object being grasped, the plurality of fingers each having a first end portion in the extending direction and a second end portion in the extending direction, the first end portion being connected to the palm, and the second end portion including a tactile sensor unit capable of detecting external forces in at least three axial directions;
a drive device that drives the palm and each of the plurality of fingers;
a position shift direction determination unit that determines in which direction the object being grasped is position-shifted with respect to the fitting recess on a basis of a detection result detected by the tactile sensor unit in a case where at least one of the external forces in at least three axial directions detected by the tactile sensor unit is a specified value or more when the palm approaches a fitting recess of an object to be assembled in a state where the object being grasped is grasped by each of the plurality of fingers so as to fit the object being grasped into the fitting recess; and
a position shift correction unit that controls the drive device to move the palm in a direction opposite to a position shift direction of the object being grasped with respect to the fitting recess determined by the position shift direction determination unit, and corrects a position shift of the object being grasped with respect to the fitting recess.

Advantageous Effects of Invention

According to the end effector device, when the palm approaches the fitting recess of the object to be assembled in a state where the object being grasped is grasped by each of the plurality of fingers so as to fit the object being grasped into the fitting recess of the object to be assembled, for example, in a case where the object being grasped and an opening edge of the fitting recess come into contact with each other, it is determined whether the object being grasped is position-shifted with respect to the fitting recess on the basis of a detection result detected by the tactile sensor unit. The position shift of the object being grasped with respect to the fitting recess is corrected by moving the palm in a direction opposite to the determined position shift direction of the object being grasped with respect to the fitting recess. With such a configuration, it is possible to realize an end effector device capable of correcting a position shift of the object being grasped with respect to the fitting recess of the object to be assembled.

DESCRIPTION OF EMBODIMENTS

Hereinafter, an example of the present disclosure will be described with reference to the accompanying drawings. Note that, in the following description, although terms indicating a specific direction or position (for example, terms including "up", "down", "right", "left") will be used as necessary, they are used for facilitating understanding of the present disclosure with reference to the drawings, and the technical scope of the present disclosure is not limited by the meaning of those terms. It should be noted that the following description is merely exemplary in nature and is not intended to limit the present disclosure, its application, or its use. Furthermore, the drawings are schematic, and the ratios of the dimensions do not always match actual ones.

First Embodiment

Figure 1:
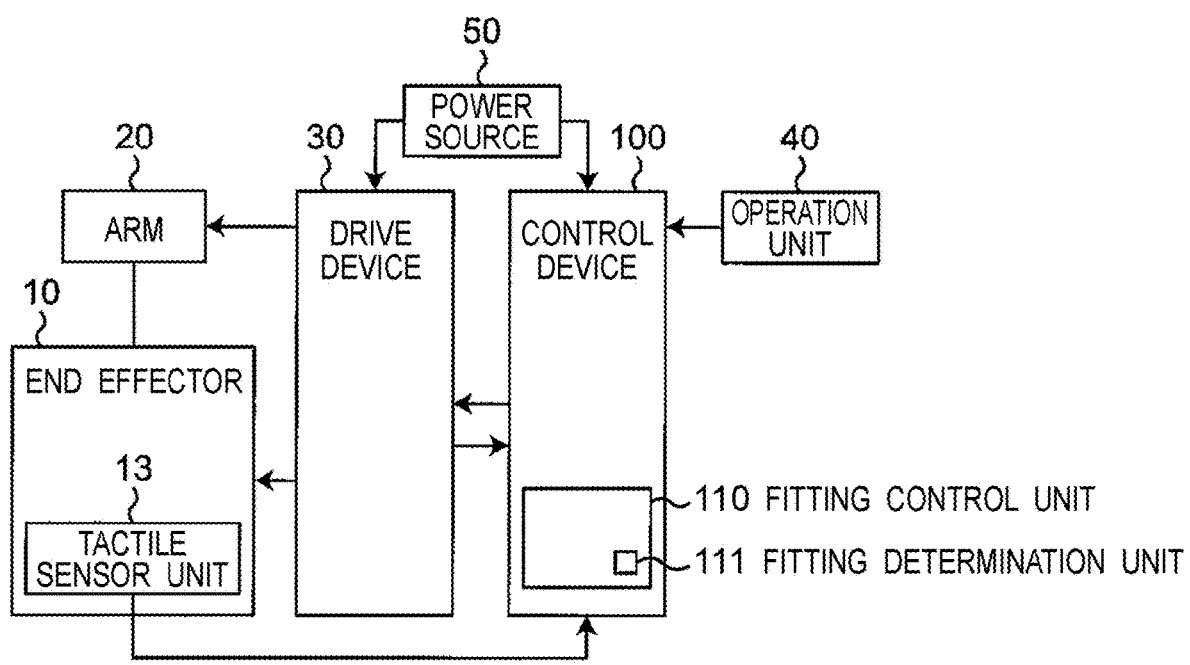
FIG. 1 is a block diagram showing an end effector device according to a first embodiment of the present disclosure.

An end effector 10 of the first embodiment of the present disclosure constitutes a part of an end effector device 1 such as a manipulator, for example, as shown in FIG. 1. As an example, the end effector device 1 includes an end effector 10, an arm 20 connected to the end effector 10, a drive device 30 that drives the end effector 10 and the arm 20, a control device 100 that controls the drive device 30, an operation unit 40 connected to the control device 100, and a power source 50 that supplies power to the drive device 30 and the control device 100. The control device 100 controls drive of the end effector 10 and the arm 20 by outputting a command to the drive device 30 based on operation received by the operation unit 40. The arm 20 is connected to a palm 11 described later of the end effector 10, and can move so as to be able to arbitrarily change a position and posture of the end effector 10 by the drive device 30. The drive device 30 has a motor (not shown) that drives the palm 11 and each finger 12, and an encoder (not shown) that detects the rotation of the motor, and is configured to output information detected by the encoder to the control device 100.

Figure 2:
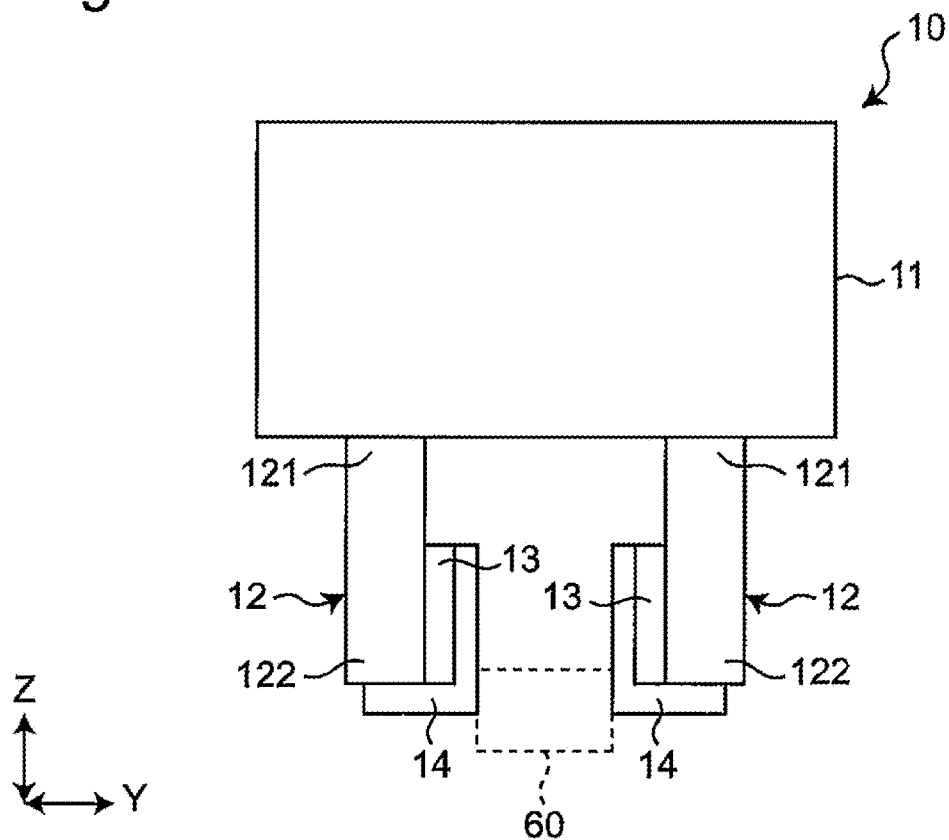
FIG. 2 is a front view showing an end effector of the end effector device of FIG. 1.
Figure 3:
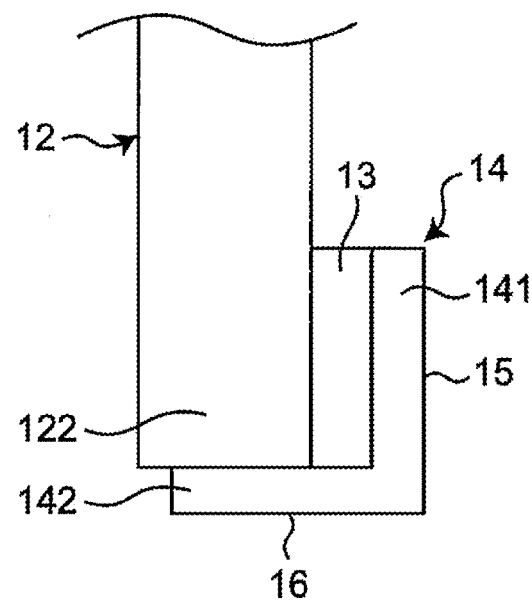
FIG. 3 is an enlarged front view showing a finger of the end effector of FIG. 2.

As shown in FIG. 2, the end effector 10 includes the palm 11, a plurality of fingers 12 (two fingers 12 in the first embodiment) connected to the palm 11, and a tactile sensor unit 13 and a force-receiving portion 14 provided at each finger 12.

Each finger 12 has a first end portion 121 provided with one end of each finger 12 in an extending direction of the finger 12. The first end portion 121 is connected to the palm 11. Each finger 12 is configured capable of grasping operation in which each finger 12 moves in a direction intersecting the extending direction thereof as well as approaching each other and grasps an object being grasped 60.

Specifically, as an example, each finger 12 has a substantially rectangular plate shape having substantially the same length in the extending direction thereof. Each finger 12 is placed side by side and substantially in parallel with another finger 12 so that their plate surfaces face each other. Each finger 12 is configured to be movable in a direction orthogonal to the plate surface by the drive device 30. The motor that drives each finger 12 may be configured by, for example, a linear motor.

Tactile sensor unit 13, for example, is configured of a capacitance type or resistance type planar tactile sensor. Tactile sensor unit 13 is provided at a second end portion 122, which is a tip portion provided with the other end of each finger 12 in the extending direction thereof, in a state capable of detecting an external force from the object being grasped 60.

Specifically, each tactile sensor unit 13 is configured to be able to detect an external force in at least three axial directions by detecting a minute displacement/deformation as an electrical change, the minute displacement/deformation being caused by force that each force-receiving portion 14 receives from the object being grasped 60. In this embodiment, as shown in FIG. 2, tactile sensor unit 13 is configured to be able to detect at least a force in a Z direction along the extending direction of each finger 12, a force in a Y direction orthogonal to the Z direction and directed from one finger 12 to the other finger 12, and a force in a X direction (that is, the paper penetration direction in FIG. 2) orthogonal to the Z direction and the Y direction.

Each force-receiving portion 14 is configured of metal, as an example. Each force-receiving portion 14 is connected to the second end portion 122 of each of the plurality of fingers 12 via the tactile sensor unit 13. Each force-receiving portion 14 is configured to receive a force from the object being grasped 60 when the object being grasped 60 is grasped by the plurality of fingers 12.

Specifically, each force-receiving portion 14 includes a first plate member 141 extending in the extending direction of each finger 12 and a second plate member 142 extending in a direction intersecting (for example, orthogonal to) the first plate member 141 as well as being away from each other.

The first plate member 141 has a grasping surface 15. The grasping surface 15 is placed facing the object being grasped 60 in a direction intersecting the extending direction of each finger 12 to be able to grasp the object being grasped 60. The grasping surface 15 receives a force in the direction intersecting the extending direction of each finger 12. Further, the second plate member 142 has a pressing surface 16. The pressing surface 16 is placed further away from the palm 11 than the second end portion 122 of each finger 12 in the extending direction of each finger 12. The pressing surface 16 extends in the direction intersecting (for example, orthogonal to) the grasping surface 15. The pressing surface 16 receives a force in the extending direction of each finger 12. That is, the force-receiving portion 14 covers the tactile sensor unit 13 in the extending direction of each finger 12 and in the direction intersecting the extending direction of each finger 12.

Next, the control device 100 of the end effector device 1 will be described.

The control device 100 includes a CPU that performs calculation, a storage medium such as a ROM and a RAM that store program, data, or the like necessary for control of the end effector 10, and an interface unit that performs input/output of signals with an outside of the end effector device 1. The control device 100 includes a fitting control unit 110 as shown in FIG. 1. The fitting control unit 110 is a function realized by the CPU executing a predetermined program.

Figure 4:
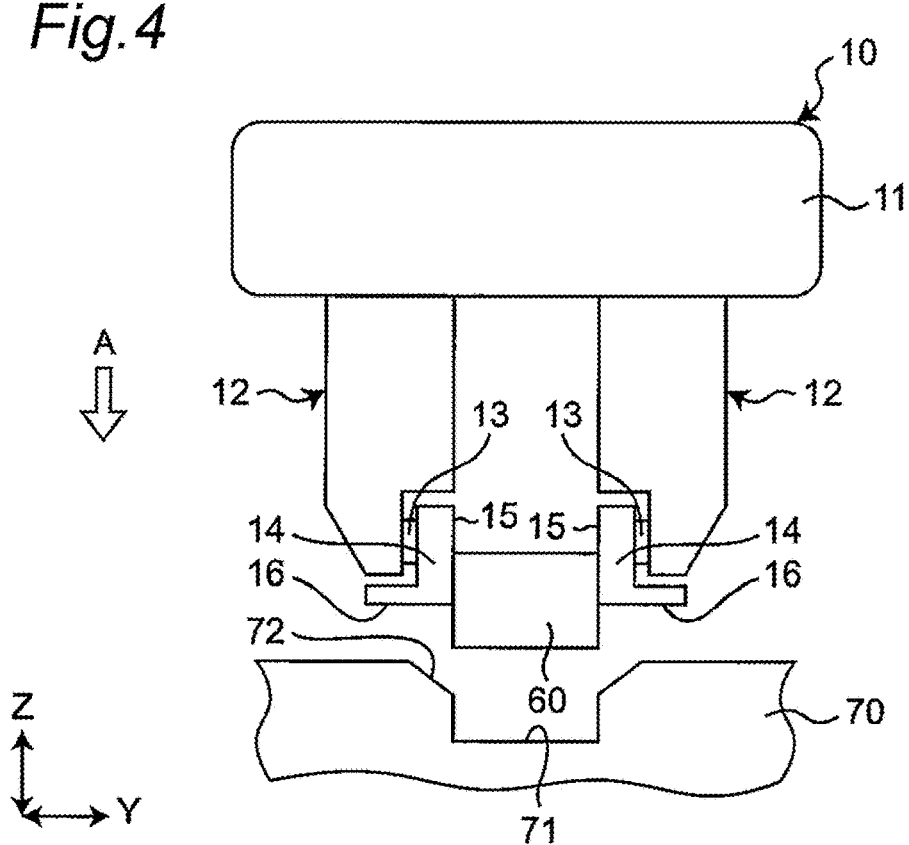
FIG. 4 is a first diagram for explaining a fitting process of the end effector device of FIG. 1.

The fitting control unit 110 presses the object being grasped 60 against the object to be assembled 70 with the pressing surface 16 so that the object being grasped 60 is fitted into the fitting recess 71 when the tactile sensor unit 13 detects that the pressing surface 16 of the force-receiving portion 14 contacts with an opening edge 72 of the fitting recess 71 in a case where the palm 11 approaches a fitting recess 71 of an object to be assembled 70 (see FIG. 4) from the Z direction (that is, the palm 11 moves in an arrow A direction in FIG. 4) and the object being grasped 60 is fitted into the fitting recess 71 in a state where the object being grasped 60 is grasped by each finger 12.

Figure 5:
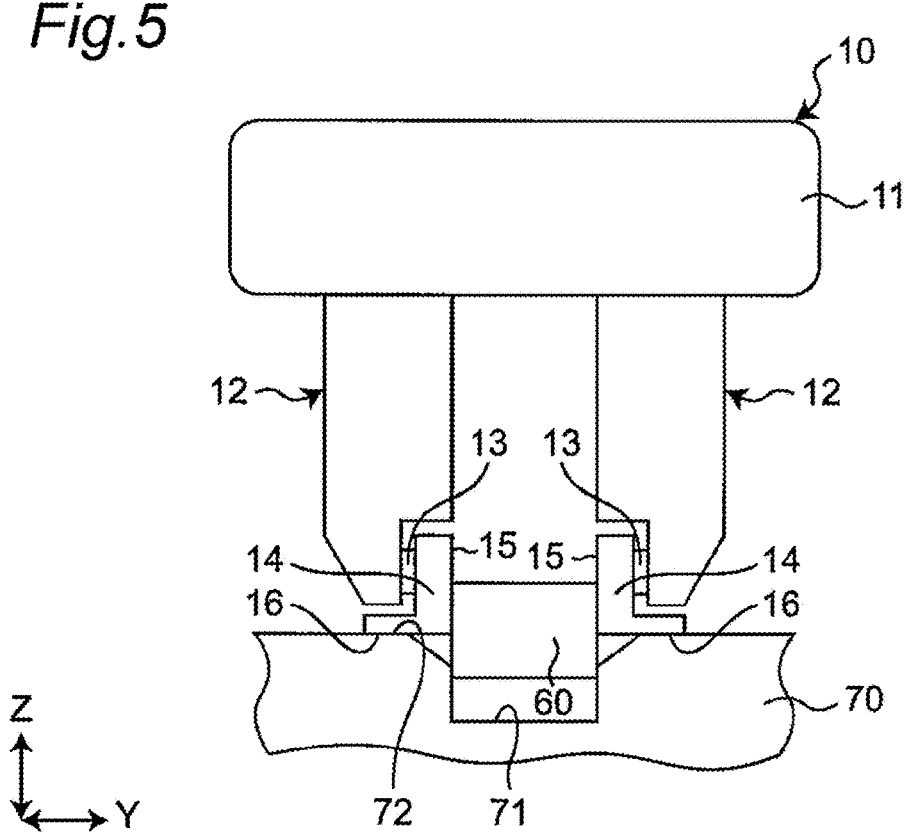
FIG. 5 is a second diagram for explaining the fitting process of the end effector device of FIG. 1.
Figure 6:
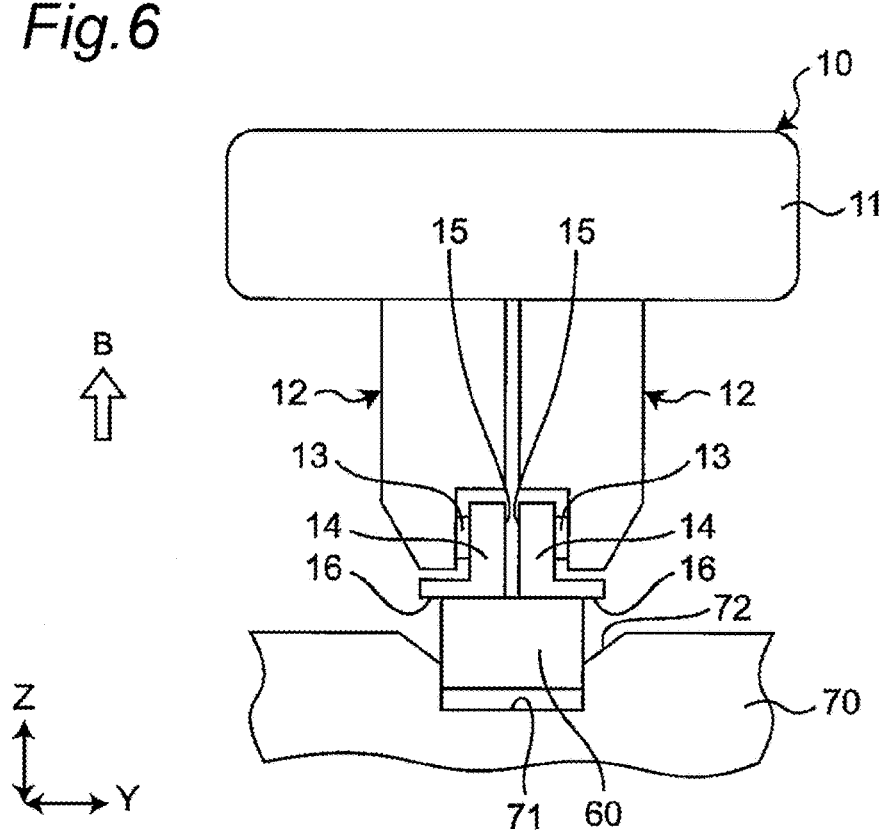
FIG. 6 is a third diagram for explaining the fitting process of the end effector device of FIG. 1.
Figure 7:
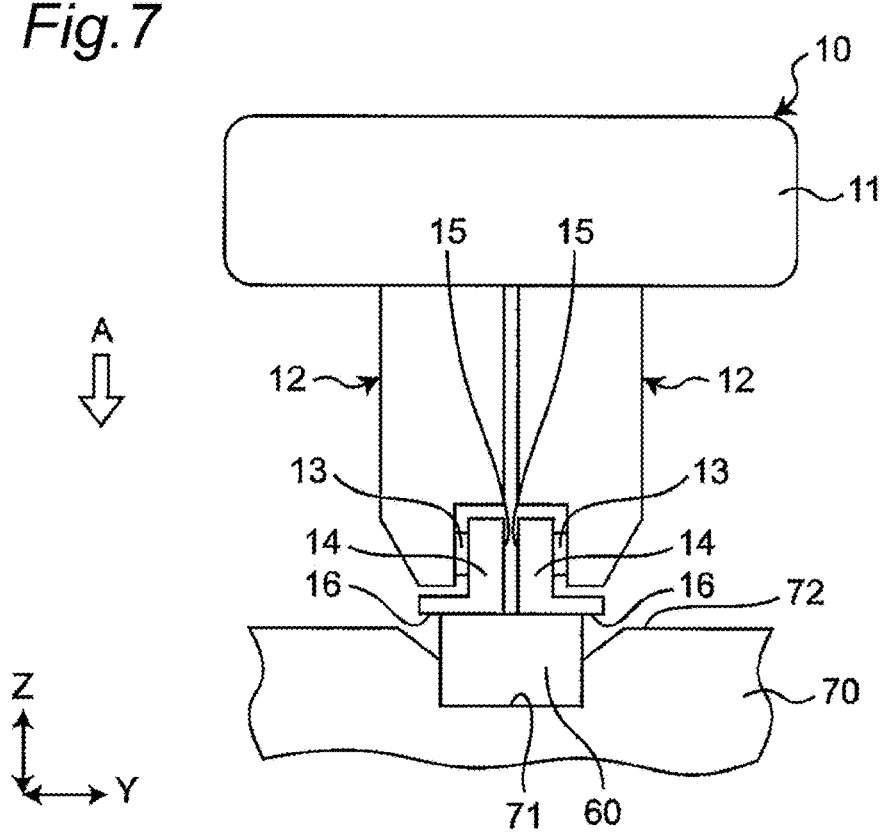
FIG. 7 is a fourth diagram for explaining the fitting process of the end effector device of FIG. 1.

Specifically, as shown in FIG. 5, when the tactile sensor unit 13 detects that the pressing surface 16 of the force-receiving portion 14 contacts with the opening edge 72 of the fitting recess 71, as shown in FIG. 6, the fitting control unit 110 releases grasp of the object being grasped 60 by each finger 12, and moves the palm 11 in a direction B away from the fitting recess 71 of the object to be assembled 70 in the Z direction. Then, as shown in FIG. 7, the fitting control unit 110 makes the palm 11 approach the fitting recess 71 of the object to be assembled 70 from the Z direction, again, in a state in which each finger 12 approaches each other and closed in the Y direction (that is, the direction intersecting the extending direction of each finger 12), to press the object being grasped 60 against the object to be assembled 70 with the pressing surface 16, thereby fitting the object being grasped 60 into the fitting recess 71.

A movement of the palm 11 in the direction B away from the fitting recess 71 of the object to be assembled 70 in the Z direction is performed until the palm 11 reaches a position at which the second end portion 122 of each finger 12 is further away from the fitting recess 71 of the object to be assembled 70 than the object being grasped 60 in the Z direction. The fitting control unit 110 calculates an amount of movement of the palm 11 based on information output from an encoder that detects a rotation of the motor of the drive device 30 that drives the palm 11, for example.

The fitting control unit 110 further includes a fitting determination unit 111 that determines whether the fitting of the object being grasped 60 into the fitting recess 71 is completed based on the detection result detected by each tactile sensor unit 13 when pressing the object being grasped 60 against the object to be assembled 70 with the pressing surface 16 to fit the object being grasped 60 into the fitting recess 71.

For example, when the palm 11 approaches the fitting recess 71 of the object to be assembled 70 from the Z direction in a state where the object being grasped 60 is grasped by each finger 12, the fitting determination unit 111 determines that the pressing surface 16 of the force-receiving portion 14 contacts with the opening edge 72 of the object to be assembled 70, as shown in FIG. 5, when the force in the Z direction detected by each tactile sensor unit 13 is a specified value (for example, 2N) or more. The specified value is determined in advance according to a dimensional configuration of each finger 12, or a shape, size, material, and the like of the object being grasped 60.

With each finger 12 closed, when the palm 11 approaches the fitting recess 71 of the object to be assembled 70 from the Z direction and pressing the object being grasped 60 against the object to be assembled 70 with the pressing surface 16, the fitting determination unit 111 determines that the fitting of the object being grasped 60 into the fitting recess 71 is completed, as shown in FIG. 7, when the force in the Z direction detected by each tactile sensor unit 13 is a specified value (for example, 5N) or more. When it is determined that the fitting of the object being grasped 60 into the fitting recess 71 is completed, the fitting control unit 110 stops the palm 11 from moving close to the fitting recess 71 of the object to be assembled 70.

It may be configured that whether the fitting of the object being grasped 60 into the fitting recess 71 is completed is determined based on both the detection result detected by each tactile sensor unit 13 and the information output from the encoder.

Subsequently, with reference to FIG. 11, a fitting process for fitting the object being grasped 60 into the fitting recess 71 of the object to be assembled 70 will be described. The fitting process described below is performed by the control device 100 executing a predetermined program.

Figure 11:
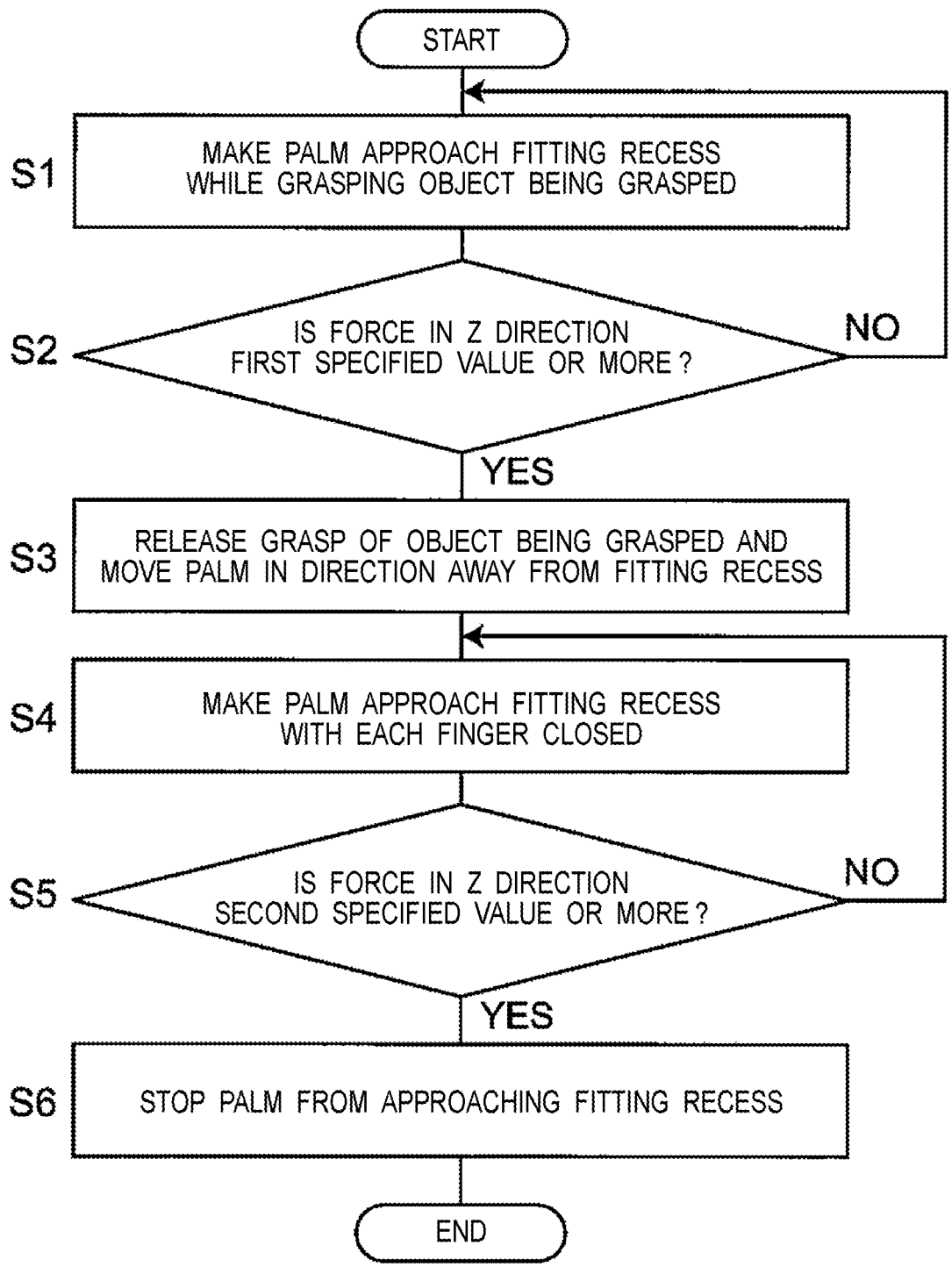
FIG. 11 is a flowchart for explaining a fitting process of the end effector device of FIG. 1.

As shown in FIG. 11, when the fitting process is started, the fitting control unit 110 makes the palm 11 move close to the fitting recess 71 of the object to be assembled 70 with the object being grasped 60 grasped by each finger 12 (step S1).

At this time, the fitting determination unit 111 determines whether the force in the Z direction detected by each tactile sensor unit 13 is the first specified value (for example, 2N) or more (step S2). When it is determined that the force in the Z direction detected by each tactile sensor unit 13 is less than the first specified value, the step S2 is repeated until the force in the Z direction detected by each tactile sensor unit 13 is the first specified value or more.

When it is determined that the force in the Z direction detected by each tactile sensor unit 13 is the first specified value or more, the fitting determination unit 111 determines that the pressing surface 16 of the force-receiving portion 14 contacts with the opening edge 72 of the object to be assembled 70. As a result, the fitting control unit 110 stops the palm 11 from moving close to the fitting recess 71 of the object to be assembled 70, releases the grasp of the object being grasped 60 by each finger 12, and moves the palm 11 in the direction B away from the fitting recess 71 of the object to be assembled 70 (step S3).

When the palm 11 moves in the direction B away from the fitting recess 71 of the object to be assembled 70, and the second end portion 122 of each finger 12 reaches a position at which the second end portion 122 further away from the fitting recess 71 of the object to be assembled 70 than the object being grasped 60, the fitting control unit 110 stops the palm 11 from moving in the direction B away from the fitting recess 71 of the object to be assembled 70, and makes the palm 11 approach the fitting recess 71 of the object to be assembled 70, again, with each finger 12 approached to each other and closed (step S4).

At this time, the fitting determination unit 111 determines whether the force in the Z direction detected by each tactile sensor unit 13 is a second specified value (for example, 5N) or more (step S5). When the force detected by each tactile sensor unit 13 is less than the second specified value, the step S5 is repeated until a predetermined force is detected by each tactile sensor unit 13.

When it is determined that the force in the Z direction detected by each tactile sensor unit 13 is the specification or more, the fitting determination unit 111 determines that the fitting of the object being grasped 60 into the fitting recess 71 is completed. As a result, the fitting control unit 110 stops the palm 11 from moving close to the fitting recess 71 of the object to be assembled 70 again (step S6), and the fitting process of the object being grasped 60 into the fitting recess 71 is completed.

The fitting recess 71 of the object to be assembled 70 may include, for example, a through hole penetrating in the Z direction.

The end effector 10 of the first embodiment includes the force-receiving portion 14 that is connected to the second end portion 122 of each finger 12 via the tactile sensor unit 13 and that receives a force from the object being grasped 60 when the object being grasped 60 is grasped by the plurality of fingers 12. The force-receiving portion 14 includes the grasping surface 15 and the pressing surface 16. The grasping surface 15 is placed facing the object being grasped 60 in a direction intersecting the extending direction of each finger 12 to be able to grasp the object being grasped 60. The pressing surface 16 is placed further away from the palm 11 than the second end portion 122 of each finger 12 in the extending direction of each finger 12 and extends in a direction intersecting the grasping surface 15. With such a configuration, for example, after grasping it by the grasping surface 15 of the force-receiving portion 14 and moving the object being grasped 60 to the fitting recess 71 of the object to be assembled 70, it is possible to press the object being grasped 60 against the object to be assembled 70 with the pressing surface 16 of the force-receiving portion 14 to fit the object being grasped 60 into the fitting recess 71. That is, it is possible to realize an end effector 10 including a tactile sensor unit 13 capable of fitting the object being grasped 60 into the fitting recess 71 of the object to be assembled 70 with a simple configuration.

The force-receiving portion 14 covers the tactile sensor unit 13 in the extending direction of each finger 12 and in a direction intersecting the extending direction of each finger 12. With such a configuration, it is possible to more reliably press the object being grasped 60 against the object to be assembled 70 with the pressing surface 16 of the force-receiving portion 14.

According to the end effector device 1 of the first embodiment, it is possible to realize the end effector device 1 capable of fitting the object being grasped 60 into the fitting recess 71 of the object to be assembled 70 with a simple configuration by the end effector 10.

The control unit 100 includes the fitting control unit 110. In a case where the tactile sensor unit 13 detects that the pressing surface 16 of the force-receiving portion 14 contacts with the opening edge 72 of the fitting recess 71 when the palm 11 approaches the fitting recess 71 of the object to be assembled 70 in a state where the object being grasped 60 is grasped by each finger 12 to fit the object being grasped 60 into the fitting recess 71, the fitting control unit 110 fits the object being grasped 60 into the fitting recess 71 by making the palm 11 approach the object being grasped 60 and pressing the object being grasped 60 against the object to be assembled 70 with the pressing surface 16 in a state where each finger 12 approaches each other in the direction intersecting the extending direction of each finger 12 and is closed after releasing the grasp of the object being grasped 60 by each finger 12 and moving the palm 11 in the direction B away from the object being grasped 60. It is possible to realize the end effector device 1 capable of fitting the object being grasped 60 into the fitting recess 71 of the object to be assembled 70 with a simple control process by the fitting control unit 110.

Since the object being grasped 60 is pressed against the object to be assembled 70 in a state where each finger 12 approaches each other in the direction intersecting the extending direction of each finger 12 and closed, as compared with the case where the object being grasped 60 is fitted into the fitting recess 71 with the object being grasped 60 grasped by each finger 12, or as compared with the case where the object being grasped 60 is pressed using any of the fingers 12 against the object to be assembled 70 with each finger 12 open to each other, the load applied to each finger 12 is reduced. As a result, a highly durable end effector device 1 can be realized.

The fitting control unit 110 further includes the fitting determination unit 111 that determines whether the fitting of the object being grasped 60 into the fitting recess 71 is completed based on the detection result detected by each tactile sensor unit 13 when pressing the object being grasped 60 against the object to be assembled 70 with the pressing surface 16 and fitting the object being grasped 60 into the fitting recess 71. The fitting determination unit 111 makes it possible to reliably fit the object being grasped 60 into the fitting recess 71 of the object to be assembled 70.

It is sufficient that the end effector 10 includes a palm 11, a plurality of fingers 12 capable of grasping operation of grasping the object being grasped 60, a tactile sensor unit 13 capable of detecting an external force from the object being grasped 60, and a force-receiving portion 14 having a grasping surface 15 and a pressing surface 16. The end effector 10 is not limited to the configuration of the first embodiment.

In the end effector 10 of the first embodiment, it is sufficient that the tactile sensor unit 13 is provided at the second end portion 122 of each finger 12 and configured to be able to detect an external force from the object being grasped 60. The configuration and type of the end effector 10 may be set according to the dimensional configuration of each finger 12 or the shape, size, material, and the like of the object being grasped 60.

Figure 8:
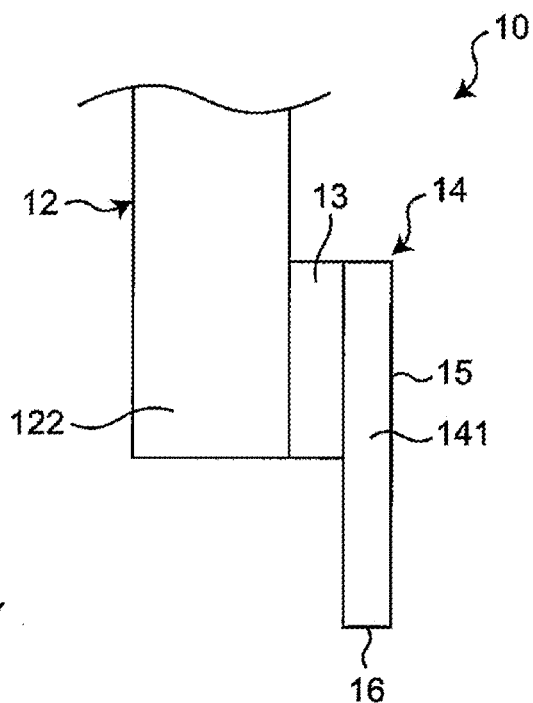
FIG. 8 is an enlarged front view of a finger showing a first modification of the end effector of FIG. 2.

The force-receiving portion 14 is not limited to the case where it is configured by the first plate member 141 and the second plate member 142. For example, as shown in FIG. 8, the force-receiving portion 14 may be configured of only the first plate member 141. In this case, a tip surface of the first plate member 141 farther from the palm 11 in the Z direction constitutes the pressing surface 16.

Figure 9:
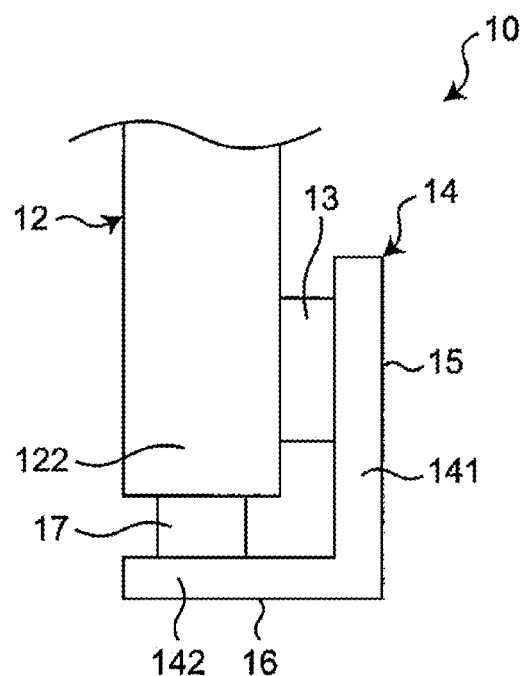
FIG. 9 is an enlarged front view of a finger showing a second modification of the end effector of FIG. 2.

The force-receiving portion 14 may be configured to include a connecting portion 17 provided on either the first plate member 141 or the second plate member 142, for example, as shown in FIG. 9. The connecting portion 17 may be configured of, for example, an elastic member such as metal or rubber. In the end effector 10 of FIG. 9, as an example, the first plate member 141 is connected to the finger 12 via the tactile sensor unit 13, and the second plate member 142 is connected to the finger 12 via the connecting portion 17. With such a configuration, the durability of the force-receiving portion 14 can be improved.

Figure 10:
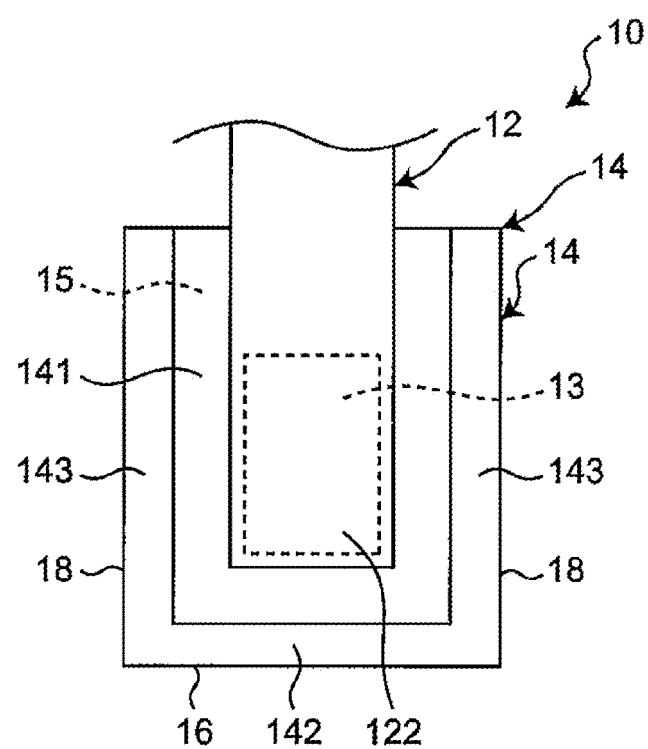
FIG. 10 is an enlarged front view of a finger showing a third modification of the end effector of FIG. 2.

The force-receiving portion 14 may be configured to include, for example, as shown in FIG. 10, a first pressing surface 16 and a second pressing surface 18 extending in a direction intersecting the grasping surface 15 and the first pressing surface 16. The end effector 10 of FIG. 10 includes the first plate member 141 having the grasping surface 15, the second plate member 142 having the first pressing surface 16, and a third plate member 143 having the second pressing surface 18. The third plate member 143 intersects (for example, orthogonal to) the first plate member 141 and the second plate member 142. With such a configuration, the object being grasped 60 can be fitted into the fitting recess 71 of the object to be assembled 70 in various aspects.

An elastic member such as metal or rubber may be attached to surfaces constituting the grasping surface 15 and the pressing surface 16 of the first plate member 141 and the second plate member 142. With such a configuration, physical characteristics such as a friction coefficient of the grasping surface 15 and the pressing surface 16 can be changed as needed. In addition, a maintainability of the force-receiving portion 14 can be improved.

In this way, it is sufficient that the force-receiving portion 14 includes a grasping surface 15 and a pressing surface 16. The grasping surface 15 is placed facing the object being grasped 60 in a direction intersecting the extending direction of each finger 12 (for example, the Y direction) to be able to grasp the object being grasped 60 and receives a force in a direction intersecting the extending direction of each finger 12. The pressing surface 16 is placed further away from the palm 11 than the second end portion 122 of each finger 12 in the extending direction (for example, Z direction) of each finger 12 and extends in a direction intersecting the grasping surface 15 to receive a force in the extending direction of each finger 12. The grasping surface 15, the pressing surface 16 and each member constituting the force-receiving portion 14 may have shapes and sizes that is appropriately set according to the dimensional configuration of each finger 12, the shape, size and material of the object being grasped 60, or the like.

Second Embodiment

Figure 12:
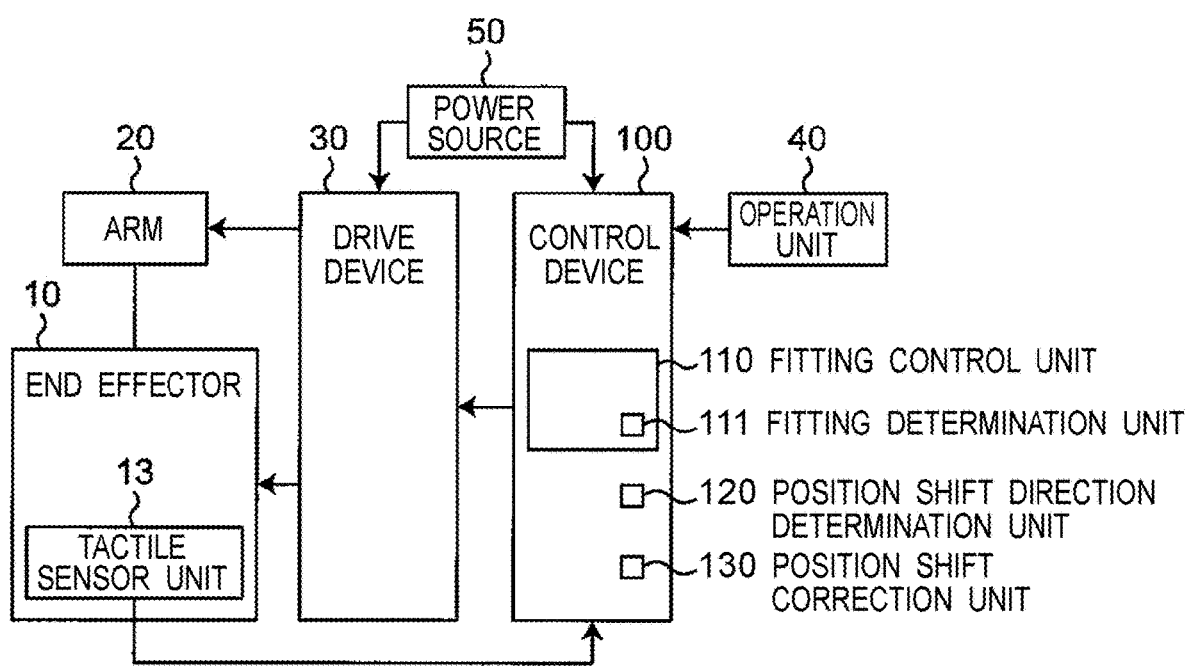
FIG. 12 is a block diagram showing an end effector device according to a second embodiment of the present disclosure.

The end effector device 1 of the second embodiment of the present disclosure differs from the first embodiment, as shown in FIG. 12, in that the control device 100 includes a position shift direction determination unit 120 and a position shift correction unit 130 in addition to the fitting control unit 110. In the second embodiment, the same parts as those in the first embodiment are designated by the same reference numbers, the description thereof will not be repeated, and the points different from those in the first embodiment will be described.

Each of the position shift direction determination unit 120 and the position shift correction unit 130 is a function realized by the CPU executing a predetermined program.

The position shift direction determination unit 120 determines in which direction the object being grasped 60 is position-shifted with respect to the fitting recess 71 based on the detection result detected by each of the tactile sensor units 13 in a case where at least one of the external forces in at least three axial directions detected by each tactile sensor unit 13 is a specified value or more when the palm 11 approaches the fitting recess 71 of the object to be assembled 70 in a state where the object being grasped 60 is grasped by each finger 12 and fitting the object being grasped 60 into the fitting recess 71 (for example, in a case where the force in the Z direction detected by each tactile sensor unit 13 is 2N or more, and it is determined by the fitting determination unit 111 that the object being grasped 60 and the opening edge 72 of the fitting recess 71 are in contact with each other).

Figure 13:
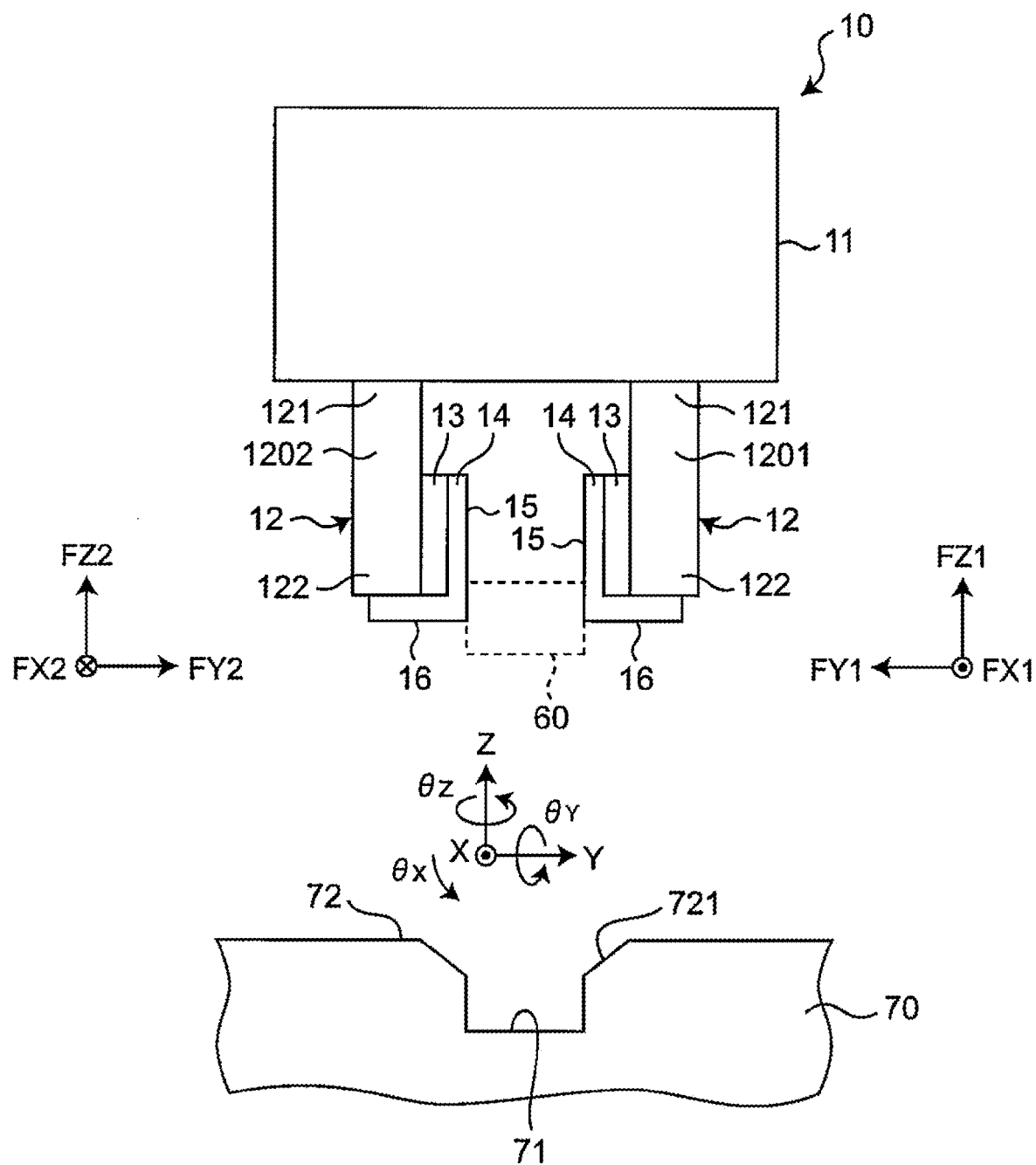
FIG. 13 is a front view for explaining a coordinate system of the end effector device of FIG. 12.

For example, forces in the X, Y, and Z directions detected by each tactile sensor unit 13 placed on the right finger 12 in FIG. 2 (hereinafter referred to as a first finger 1201) of the two fingers 12 are FX1, FY1, and FZ1, respectively. Forces in the X, Y, and Z directions detected by each tactile sensor unit 13 placed on the left finger 12 in FIG. 2 (hereinafter referred to as a second finger 1202) of the two fingers 12 are FX2, FY2, and FZ2, respectively. FIG. 13 shows a coordinate system of the tactile sensor unit 13 of the first finger 1201, a coordinate system of the tactile sensor unit 13 of the second finger 1202, and a coordinate system of the object being grasped 60.

In this case, the position shift direction determination unit 120 determines in which of the three axial directions the position shift of the object being grasped 60 with respect to the fitting recess 71 occurs based on a sum or difference of the forces in the X, Y, and Z directions detected by each tactile sensor unit 13 when it is determined that the object being grasped 60 contacts with the opening edge 72 of the fitting recess 71.

For example, a position shift of the object being grasped 60 with respect to the fitting recess 71 in the Y direction is determined by a difference in force in the Y direction (that is, FY1−FY2) or a difference in force in the Z direction (that is, FZ1−FZ2). When FY1−FY2 or FZ1−FZ2 is a positive value, it is determined that the object being grasped 60 is position-shifted in a positive direction of Y with respect to the fitting recess 71.

When an inclined surface 721 is formed on the opening edge 72 of the fitting recess 71, the position shift of the object being grasped 60 with respect to the fitting recess 71 in the Y direction is determined by the difference in force in the Z direction (that is, FZ1−FZ2) before it is determined that the object being grasped 60 contacts with the opening edge 72 (that is, the inclined surface 721) of the object to be assembled 70 and is determined by the difference in force in the Y direction (that is, FY1−FY2) after it is determined that the object being grasped 60 contacts with the opening edge 72 of the object to be assembled 70.

A position shift of the object being grasped 60 with respect to the fitting recess 71 in the X direction is determined by a difference in force in the X direction (that is, FX1−FX2). When FX1−FX2 is a negative value, it is determined that the object being grasped 60 is shifted in a positive direction of X with respect to the fitting recess 71.

A position shift of the object being grasped 60 with respect to the fitting recess 71 around the Z direction is determined by a sum of forces in the X direction (that is, FX1+FX2). When FX1+FX2 is a positive value, it is determined that the object being grasped 60 is shifted around a rotation direction shown by θZ in FIG. 13 (that is, counterclockwise when viewed in a direction from the positive position on the Z axis toward the origin).

The position shift direction determination unit 120 determines whether to complete the correction of position shift of the object being grasped 60 with respect to the fitting recess 71 based on whether one or more of or all of a sum and differences of the external forces in the same axial direction among the external forces in the three axial directions detected by each tactile sensor unit 13 (for example, FX1−FX2, FY1−FY2, FZ1−FZ2, FX1+FX2) are a specified value (for example, 0.1N) or less. This specified value is determined in advance according to the dimensional configuration of each finger 12 or the shape, size, material, and the like of the object being grasped 60.

The position shift direction determination unit 120 may determine whether the object being grasped 60 contacts the opening edge 72 of the fitting recess 71 at one point based on the difference in force in the X direction (that is, FX1−FX2) and the difference in force in the Z direction (that is, FZ1−FZ2). When the object being grasped 60 contacts the opening edge 72 at one point, the object being grasped 60 is position-shifted with respect to the fitting recess 71 around the X direction (that is, around a θX direction in FIG. 13) and/or around the Y direction (that is, around a θY direction in FIG. 13).

The position shift correction unit 130 controls the drive device 30 to move the object being grasped 60 in a direction opposite to a position shift direction (in other words, in a direction having the same axis as and the different direction from the position shift direction) of the object being grasped 60 with respect to the fitting recess 71 determined by the position shift direction determination unit 120, thereby correcting the position shift of the object being grasped 60 with respect to the fitting recess 71.

For example, it is assumed that the position shift direction determination unit 120 determines that the object being grasped 60 is shifted in the positive direction of X with respect to the fitting recess 71. In this case, the position shift correction unit 130 controls the drive device 30 to drive at least one of the palm 11 and each finger 12 so that the object being grasped 60 moves in a negative direction of X by a specified amount (for example, 0.05 mm).

When correcting the position shift of the object being grasped 60 with respect to the fitting recess 71, in a case where the sum of forces in the Z direction (that is, FZ1+FZ2) detected by each tactile sensor unit 13 exceeds a specified value (for example, 2N), and it is determined by the position shift direction determination unit 120 that the object being grasped 60 contacts with the opening edge 72 of the fitting recess 71, the position shift correction unit 130 temporarily suspends the position shift correction, and moves the object being grasped 60 in the Z direction as well as a direction away from the fitting recess 71 of the object to be assembled 70, until the sum of forces in the Z direction (that is, FZ1+FZ2) detected by each tactile sensor unit 13 is the specified value (for example, 2N) or less.

When correcting the position shift of the object being grasped 60 with respect to the fitting recess 71, in a case where the sum of forces in the Z direction detected by each tactile sensor unit 13 is less than a specified value (for example, 1N) (that is, FZ1+FZ2<1N), the position shift direction determination unit 120 determines that the contact of the object being grasped 60 with respect to the opening edge 72 of the fitting recess 71 cannot be maintained. When it is determined that the contact of the object being grasped 60 with respect to the opening edge 72 of the fitting recess 71 cannot be maintained, the position shift correction unit 130 temporarily suspends the position shift correction, and moves the object being grasped 60 in the Z direction as well as a direction approaching the fitting recess 71 of the object to be assembled 70, until the sum of forces in the Z direction detected by each tactile sensor unit 13 is the specified value or more (that is, FZ1+FZ2≥1N).

In the second embodiment, the fitting determination unit 111 determines whether the object being grasped 60 contacts with the opening edge 72 of the fitting recess 71 on the basis of whether the sum of forces in the Z direction (that is, FZ1+FZ2) detected by each tactile sensor unit 13 exceeds a specified value (for example, 2N) when the object being grasped 60 approaches the fitting recess 71 of the object to be assembled 70 from the Z direction. The specified value is determined in advance according to the dimensional configuration of each finger 12, or the shape, size, material, and the like of the object being grasped 60.

Subsequently, with reference to FIGS. 14 and 15, a position shift correction process of the object being grasped 60 with respect to the object to be assembled 70 during the fitting process of fitting the object being grasped 60 into the fitting recess 71 of the object to be assembled 70 will be described. The fitting process described below is performed by the control device 100 executing a predetermined program.

Figure 14:
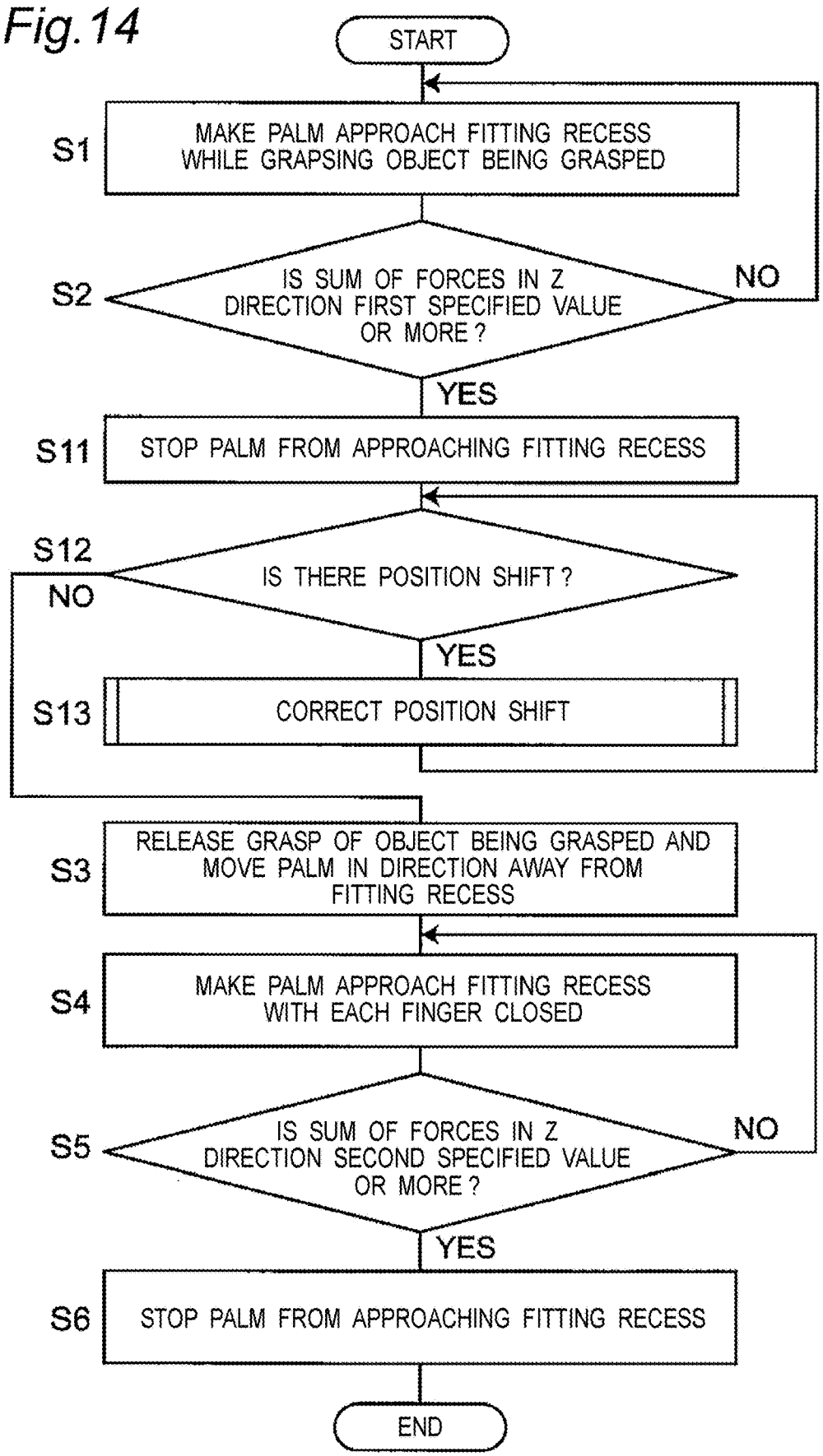
FIG. 14 is a first flowchart for explaining a position shift correction process of the end effector device of FIG. 12.

As shown in FIG. 14, when it is determined in step S2 that the force in the Z direction detected by each tactile sensor unit 13 is the first specified value or more, the fitting control unit 110 stops the palm 11 from moving close to the fitting recess 71 of the object to be assembled 70 (step S11), and the position shift direction determination unit 120 determines whether the object being grasped 60 is position-shifted with respect to the fitting recess 71 (step S12).

Figure 15:
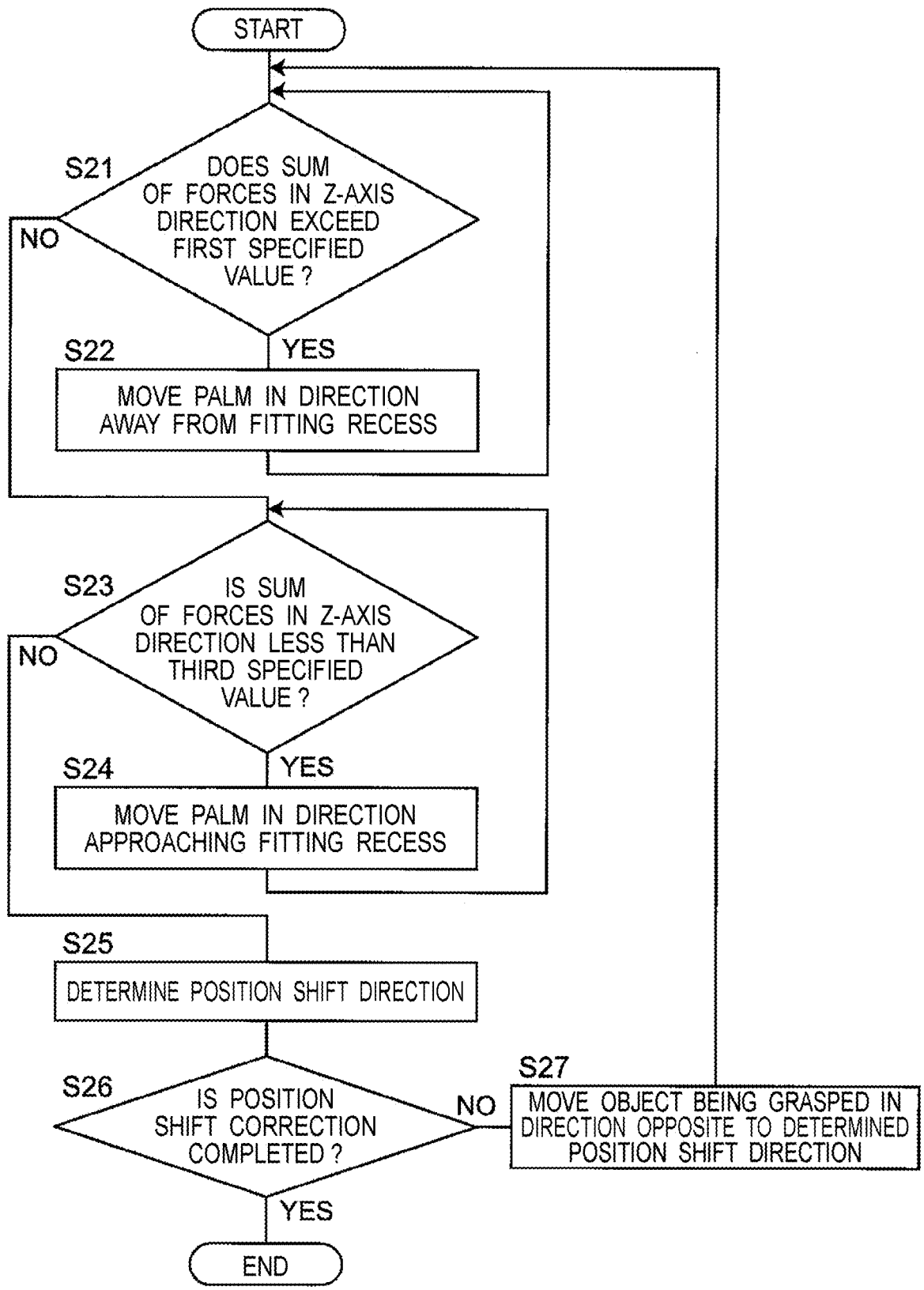
FIG. 15 is a second flowchart for explaining the position shift correction process of the end effector device of FIG. 12.

In this position shift correction, as shown in FIG. 15, the position shift correction unit 130 determines whether the sum of forces in the Z direction (that is, FZ1+FZ2) detected by each tactile sensor unit 13 exceeds the first specified value (for example, 2N) (step S21). When it is determined that the sum of forces in the Z direction detected by each tactile sensor unit 13 exceeds the first specified value, the position shift correction unit 130 does not perform the position shift correction, and moves the object being grasped 60 in the Z direction as well as a direction away from the fitting recess 71 of the object to be assembled 70, until the sum of forces in the Z direction detected by each tactile sensor unit 130 is the first specified value or less (step S22).

When it is determined that the sum of forces in the Z direction detected by each tactile sensor unit 13 does not exceed the first specified value, the position shift direction determination unit 120 determines whether the sum of forces in the Z direction detected by each tactile sensor unit 13 is less than a third specified value (for example, 1N) (step S23). When it is determined that the sum of forces in the Z direction detected by each tactile sensor unit 13 is less than the third specified value (for example, 1N), the position shift correction unit 130 does not perform the position shift correction, and moves the object being grasped 60 in the Z direction as well as a direction approaching the fitting recess 71 of the object to be assembled 70, until the sum of forces in the Z direction detected by each tactile sensor unit 13 is the third specified value or more (step S24).

When it is determined that the sum of forces in the Z direction detected by each tactile sensor unit 13 is not less than the third specified value (for example, 1N), the position shift direction determination unit 120 determines a position shift direction of the object being grasped 60 with respect to the fitting recess 71 (step S25), and determines whether to complete the position shift correction of the object being grasped 60 with respect to the fitting recess 71 (step S26).

When it is determined to complete the position shift correction, the process proceeds to step S3, where the fitting control unit 110 releases the grasp of the object being grasped 60 by each finger 12, and moves the palm 11 in the direction B away from the fitting recess 71 of the object to be assembled 70. When it is determined not to complete the position shift correction, the position shift correction unit 130 moves the object being grasped 60 in a direction opposite to the position shift direction of the object being grasped 60 with respect to the fitting recess 71 determined by the position shift direction determination unit 120 to correct the position shift of the object being grasped 60 with respect to the fitting recess 71 (step S26). Then, returning to step S21, the position shift correction unit 130 determines whether the sum of forces in the Z direction detected by each tactile sensor unit 13 exceeds the first specified value.

In the end effector device 1 of the second embodiment, in a case where the object being grasped 60 and the opening edge 72 of the fitting recess 71 contacts with each other when the palm 11 approaches the fitting recess 71 of the object to be assembled 70 and fitting the object being grasped 60 into the fitting recess 71 of the object to be assembled 70 in a state where the object being grasped 60 is grasped by each finger 12, it is determined whether the object being grasped 60 is position-shifted with respect to the fitting recess 71 based on the detection result detected by each tactile sensor unit 13, and the palm 11 moves in the direction opposite to a direction of the determined position shift of the object being grasped 60 with respect to the fitting recess 71 to correct the position shift of the object being grasped 60 with respect to the fitting recess 71. With such a configuration, it is possible to realize an end effector device 1 capable of correcting the position shift of the object being grasped 60 with respect to the fitting recess 71 of the object to be assembled 70.

The position shift direction determination unit 120 determines the position shift direction of the object being grasped 60 with respect to the fitting recess 71 based on one or more of or all of the sum and differences of the external forces in the same axial direction among the external forces in the at least three axial directions detected by each tactile sensor unit 13. As a result, the position shift direction of the object being grasped 60 with respect to the fitting recess 71 can be determined with a simple configuration.

The position shift correction unit 130 completes the correction of the position shift of the object being grasped 60 with respect to the fitting recess 71 when one or more of or all of the sum and differences of the external forces in the same axial direction among the external forces in the at least three axial directions detected by each tactile sensor unit 13 are the specified value or less. As a result, it is possible to determine whether the correction of the position shift of the object being grasped 60 with respect to the fitting recess 71 is completed with a simple configuration.

The end effector 10 includes a plate-shaped first finger 1201 and a plate-shaped second finger 1202 as a plurality of fingers 12, and a force-receiving portion 14. The plate-shaped first finger 1201 and the plate-shaped second finger 1202 are arranged so that the plate surfaces face each other. The force-receiving portion 14 is connected to the second end portion 122 of each finger 1201, 1202 via the tactile sensor unit 13 and receives a force from the object being grasped 60 when the first finger 1201 and the second finger 1202 grasp the object being grasped 60. The force-receiving portion 14 has a grasping surface 15 and a pressing surface 16. The grasping surface 15 is placed facing the object being grasped 60 in the direction intersecting the extending direction of each finger 1201, 1202 to be able to grasp the object being grasped 60 and receives the force in the direction intersecting the extending direction of each finger 1201, 1202. The pressing surface 16 is placed further away from the palm 11 than the second end portion 122 of each finger 1201, 1202 in the extending direction of each finger 1201, 1202 and extends in a direction intersecting the grasping surface 15 to receive a force in the extending direction of each finger 1201, 1202. With such a configuration, it is possible to realize an end effector device 1 capable of fitting the object being grasped 60 into the fitting recess 71 of the object to be assembled 70 with a simple configuration and correcting the position shift of the object being grasped 60 with respect to the fitting recess 71 of the object to be assembled 70.

In the end effector device 1 of the second embodiment, it is sufficient that the tactile sensor unit 13 can detect an external force in at least three axial directions. A configuration and type of the tactile sensor unit 13 can be set according to a dimensional configuration of each finger 12 or a shape, size, material, and the like of the object being grasped 60. For example, the tactile sensor unit 13 may be configured to be able to detect only external forces in the three axial directions orthogonal to one another, or may be configured to be able to detect moments in each axial direction in addition to the external forces in the three axial directions orthogonal to one another.

When the tactile sensor unit 13 is configured to be able to detect moments in each axial direction in addition to the external forces in the three axial directions orthogonal to one another, for example, the position shift of the object being grasped 60 with respect to the fitting recess 71 in the Y direction can be determined by a difference in moments in the X-axis direction.

When the difference in moments in the X-axis direction is a negative value, it is determined that the object being grasped 60 is shifted in the positive direction of Y with respect to the fitting recess 71. The position shift of the object being grasped 60 with respect to the fitting recess 71 in the X direction can be determined by the difference in moments in the Y-axis direction. When the difference in moments in the Y-axis direction is a positive value, it is determined that the object being grasped 60 is shifted in the positive direction of X with respect to the fitting recess 71.

The position shift of the object being grasped 60 with respect to the fitting recess 71 around the Z direction can be determined by a sum of moments in the Z-axis direction. When the sum of moments in the Z-axis direction is a positive value, it is determined that the object being grasped 60 is shifted around the rotation direction shown by θZ in FIG. 13.

It is sufficient that the end effector 10 includes a palm 11, a plurality of fingers 12 capable of grasping operation of grasping the object being grasped 60, and a tactile sensor unit 13 capable of detecting an external force from the object being grasped 60. The end effector 10 is not limited to the configuration of the second embodiment.

The position shift direction determination unit 120 is not limited to the second embodiment. The position shift direction determination unit 120 may have any configuration that can determine whether the object being grasped 60 is position-shifted with respect to the fitting recess 71 in at least one of the three axial directions based on the detection result detected by the tactile sensor unit 13.

The position shift correction unit 130 is not limited to the second embodiment. The position shift correction unit 130 may have any configuration that can correct the position shift of the object being grasped 60 with respect to the fitting recess 71 by moving the palm 11 in a direction opposite to the position shift direction of the object being grasped 60 with respect to the fitting recess 71 determined by the position shift direction determination unit 120.

As described above, various embodiments of the present disclosure have been described in detail with reference to the drawings, and finally, various aspects of the present disclosure will be described. It is to be noted that in the following description, description will be provided with reference numerals attached thereto as an example.

An end effector device 1 of a first aspect of the present disclosure includes:
    an end effector 10 including
        a palm 11 and
        a plurality of fingers 12 capable of grasping operation in which each of the plurality of fingers 12 moves in a direction intersecting an extending direction thereof as well as approaching each other and grasps an object being grasped 60, the plurality of fingers 12 each having a first end portion 121 in an extending direction and a second end portion 122 in the extending direction, the first end portion 121 being connected to the palm 12, and the second end portion 122 including a tactile sensor unit 13 capable of detecting external forces in at least three axial directions;

a drive device 30 that drives each of the palm 11 and the plurality of fingers 12;

a position shift direction determination unit 120 that determines in which direction the object being grasped 60 is position-shifted with respect to a fitting recess 71 based on a detection result detected by the tactile sensor unit 13 in a case where at least one of the external forces in at least three axial directions detected by each of the tactile sensor units 13 is a specified value or more when the palm 11 approaches the fitting recess 71 of an object to be assembled 70 in a state where the object being grasped 60 is grasped by each of the plurality of fingers 12 to fit the object being grasped 60 into the fitting recess 71; and a position shift correction unit 130 that controls the drive device 30 to move the palm 11 in a direction opposite to a position shift direction of the object being grasped 60 with respect to the fitting recess 71 determined by the position shift direction determination unit 120, and corrects a position shift of the object being grasped 60 with respect to the fitting recess 71.

According to the end effector device 1 of the first aspect, it is possible to realize the end effector device 1 capable of correcting the position shift of the object being grasped 60 with respect to the fitting recess 71 of the object to be assembled 70.

In an end effector device 1 of a second aspect of the present disclosure, the position shift direction determination unit 120 determines the position shift direction based on any one or more of or all of a sum and differences of the external forces in the same axial direction among the external forces in the at least three axial directions detected by the tactile sensor unit 13.

According to the end effector device 1 of the second aspect, the position shift direction of the object being grasped 60 with respect to the fitting recess 71 can be determined with a simple configuration.

In an end effector device 1 of a third aspect of the present disclosure, the position shift correction unit 130 completes correction of the position shift of the object being grasped 60 with respect to the fitting recess 71 when any one or more of or all of the sum and differences of the external forces in the same axial direction among the external forces in the at least three axial directions detected by the tactile sensor unit 13 are a specified value or less.

According to the end effector device 1 of the third aspect, it is possible to determine whether or not the correction of the position shift of the object being grasped 60 with respect to the fitting recess 71 is completed with a simple configuration.

In an end effector device 1 of a fourth aspect of the present disclosure, the tactile sensor unit 13 is configured to be able to detect only external forces in three axial directions orthogonal to one another.

According to the end effector device 1 of the fourth aspect, the end effector device 1 having a high degree of freedom in design can be realized.

In an end effector device 1 according to a fifth aspect of the present disclosure, the position shift direction determination unit 120 determines whether the object being grasped 60 is position-shifted with respect to the fitting recess 71 by using only external forces in three axial directions among the at least three axial directions.

According to the end effector device 1 of the fifth aspect, the end effector device 1 having a high degree of freedom in design can be realized.

In an end effector device 1 of a sixth aspect of the present disclosure, the end effector 10 includes a plate-shaped first finger 1201 and a plate-shaped second finger 1202 arranged so that plate surfaces face each other, as the plurality of fingers 12, and a force-receiving portion 14 that is connected to the second end portion 122 of each of the first finger 1201 and the second finger 1202 via the tactile sensor unit 13 and that receives a force from the object being grasped 60 when the object being grasped 60 is grasped by the first finger 1201 and the second finger 1202, and the force-receiving portion 14 includes a grasping surface 15 that is placed facing the object being grasped 60 in a direction intersecting the extending direction to be able to grasp the object being grasped 60, the grasping surface 15 receiving a force in the direction intersecting the extending direction, and a pressing surface 16 that is placed further away from the palm 11 than the second end portion 122 of each of the first finger 1201 and the second finger 1202 in the extending direction, the pressing surface 16 extending in a direction intersecting the grasping surface 15 and receiving a force in the extending direction.

According to the end effector device 1 of the sixth aspect, it is possible to realize the end effector device 1 capable of fitting the object being grasped 60 into the fitting recess 71 of the object to be assembled 70 with a simple configuration, and capable of correcting the position shift of the object being grasped 60 with respect to the fitting recess 71 of the object to be assembled 70.

Note that, by appropriately combining any of the above-described various embodiments or modifications, it is possible to achieve the effects of the respective embodiments or modifications. In addition, a combination of the embodiments or a combination of the examples or a combination of the embodiment and the example is possible, and a combination of the features in the different embodiments or the examples is also possible.

Although the present disclosure has been fully described in connection with preferred embodiments with reference to the accompanying drawings, various variations and modifications will be apparent to those skilled in the art. It is to be understood that such variations and modifications are included in the appended claims unless the variations and modifications depart from the scope of the present disclosure as set forth in the claims.

INDUSTRIAL APPLICABILITY

The end effector of the present disclosure can be applied to, for example, an end effector device of an industrial robot.

The end effector device of the present disclosure can be applied to, for example, an industrial robot.

REFERENCE SIGNS LIST 1. end effector device
10. end effector
11. palm
12. finger
1201. first finger
1202. second finger
121. first end portion
122. tip portion
13. tactile sensor unit
14. force-receiving portion
141. first plate member
142. second plate member
143. third plate member
15. grasping surface
16. pressing surface (first pressing surface)
17. connecting portion
18. second pressing surface
20. arm
30. drive device
40. operation unit
50. power source
60. object being grasped
70. object to be assembled
71. fitting recess
72. opening edge
100. control device
110. fitting control unit
111. fitting determination unit
120. position shift direction determination unit
130. position shift correction unit

The invention claimed is:

1. An end effector device, comprising:
   an end effector including
     a palm and
     a plurality of fingers each having a first end portion in an extending direction and a second end portion in the extending direction, the plurality of fingers being capable of grasping operation of moving in a direction intersecting the extending direction as well as approaching each other to grasp an object being grasped, the first end portion being connected to the palm, and the second end portion including a tactile sensor unit capable of detecting external forces in at least three axial directions;
   a drive device that drives the palm and each of the plurality of fingers;
   a position shift direction determination unit that determines in which direction the object being grasped is position-shifted with respect to a fitting recess based on a detection result detected by the tactile sensor unit in a case where at least one of the external forces in at least three axial directions detected by the tactile sensor unit is a specified value or more when the palm approaches the fitting recess of an object to be assembled in a state where the object being grasped is grasped by each of the plurality of fingers to fit the object being grasped into the fitting recess; and
   a position shift correction unit that controls the drive device to move the palm in a direction opposite to a position shift direction of the object being grasped with respect to the fitting recess determined by the position shift direction determination unit, and corrects a position shift of the object being grasped with respect to the fitting recess.

2. The end effector device according to claim 1, wherein the position shift direction determination unit determines the position shift direction based on any one or more of or all of a sum and differences of the external forces in a same axial direction among the external forces in at least three axial directions detected by the tactile sensor unit.

3. The end effector device according to claim 2, wherein the position shift correction unit completes correction of the position shift of the object being grasped with respect to the fitting recess when any one or more of or all of the sum and differences of the external forces in the same axial direction among the external forces in the at least three axial directions detected by the tactile sensor unit are a specified value or less.

4. The end effector device according to claim 3, wherein the tactile sensor unit is configured to be able to detect only external forces in three axial directions orthogonal to one another.

5. The end effector device according to claim 4, wherein the end effector includes
   a plate-shaped first finger and a plate-shaped second finger arranged so that plate surfaces face each other, as the plurality of fingers, and
   a force-receiving portion that is connected to the second end portion of each of the first finger and the second finger via the tactile sensor unit, and that receives a force from the object being grasped when the object being grasped is grasped by the first finger and the second finger, and
   the force-receiving portion includes
   a grasping surface that is placed facing the object being grasped in a direction intersecting the extending direction to be able to grasp the object being grasped, the grasping surface receiving a force in the direction intersecting the extending direction, and
   a pressing surface that is placed further away from the palm than the second end portion of each of the first finger and the second finger in the extending direction, the pressing surface extending in a direction intersecting the grasping surface and receiving a force in the extending direction.

6. The end effector device according to claim 3, wherein the position shift direction determination unit determines whether the object being grasped is position-shifted with respect to the fitting recess by using only external forces in three axial directions among the at least three axial directions.

7. The end effector device according to claim 6, wherein the end effector includes
   a plate-shaped first finger and a plate-shaped second finger arranged so that plate surfaces face each other, as the plurality of fingers, and
   a force-receiving portion that is connected to the second end portion of each of the first finger and the second finger via the tactile sensor unit, and that receives a force from the object being grasped when the object being grasped is grasped by the first finger and the second finger, and
   the force-receiving portion includes
   a grasping surface that is placed facing the object being grasped in a direction intersecting the extending direction to be able to grasp the object being grasped, the grasping surface receiving a force in the direction intersecting the extending direction, and
   a pressing surface that is placed further away from the palm than the second end portion of each of the first finger and the second finger in the extending direction, the pressing surface extending in a direction intersecting the grasping surface and receiving a force in the extending direction.

8. The end effector device according to claim 3, wherein the end effector includes
   a plate-shaped first finger and a plate-shaped second finger arranged so that plate surfaces face each other, as the plurality of fingers, and
   a force-receiving portion that is connected to the second end portion of each of the first finger and the second finger via the tactile sensor unit, and that receives a force from the object being grasped when the object being grasped is grasped by the first finger and the second finger, and
   the force-receiving portion includes
      a grasping surface that is placed facing the object being grasped in a direction intersecting the extending direction to be able to grasp the object being grasped, the grasping surface receiving a force in the direction intersecting the extending direction, and
      a pressing surface that is placed further away from the palm than the second end portion of each of the first finger and the second finger in the extending direction, the pressing surface extending in a direction intersecting the grasping surface and receiving a force in the extending direction.

9. The end effector device according to claim 2, wherein the tactile sensor unit is configured to be able to detect only external forces in three axial directions orthogonal to one another.

10. The end effector device according to claim 9, wherein the end effector includes
    a plate-shaped first finger and a plate-shaped second finger arranged so that plate surfaces face each other, as the plurality of fingers, and
    a force-receiving portion that is connected to the second end portion of each of the first finger and the second finger via the tactile sensor unit, and that receives a force from the object being grasped when the object being grasped is grasped by the first finger and the second finger, and
    the force-receiving portion includes
       a grasping surface that is placed facing the object being grasped in a direction intersecting the extending direction to be able to grasp the object being grasped, the grasping surface receiving a force in the direction intersecting the extending direction, and
       a pressing surface that is placed further away from the palm than the second end portion of each of the first finger and the second finger in the extending direction, the pressing surface extending in a direction intersecting the grasping surface and receiving a force in the extending direction.

11. The end effector device according to claim 2, wherein the position shift direction determination unit determines whether the object being grasped is position-shifted with respect to the fitting recess by using only external forces in three axial directions among the at least three axial directions.

12. The end effector device according to claim 11, wherein the end effector includes
    a plate-shaped first finger and a plate-shaped second finger arranged so that plate surfaces face each other, as the plurality of fingers, and
    a force-receiving portion that is connected to the second end portion of each of the first finger and the second finger via the tactile sensor unit, and that receives a force from the object being grasped when the object being grasped is grasped by the first finger and the second finger, and
    the force-receiving portion includes
       a grasping surface that is placed facing the object being grasped in a direction intersecting the extending direction to be able to grasp the object being grasped, the grasping surface receiving a force in the direction intersecting the extending direction, and
       a pressing surface that is placed further away from the palm than the second end portion of each of the first finger and the second finger in the extending direction, the pressing surface extending in a direction intersecting the grasping surface and receiving a force in the extending direction.

13. The end effector device according to claim 2, wherein the end effector includes
    a plate-shaped first finger and a plate-shaped second finger arranged so that plate surfaces face each other, as the plurality of fingers, and
    a force-receiving portion that is connected to the second end portion of each of the first finger and the second finger via the tactile sensor unit, and that receives a force from the object being grasped when the object being grasped is grasped by the first finger and the second finger, and
    the force-receiving portion includes
       a grasping surface that is placed facing the object being grasped in a direction intersecting the extending direction to be able to grasp the object being grasped, the grasping surface receiving a force in the direction intersecting the extending direction, and
       a pressing surface that is placed further away from the palm than the second end portion of each of the first finger and the second finger in the extending direction, the pressing surface extending in a direction intersecting the grasping surface and receiving a force in the extending direction.

14. The end effector device according to claim 1, wherein the tactile sensor unit is configured to be able to detect only external forces in three axial directions orthogonal to one another.

15. The end effector device according to claim 14, wherein
    the end effector includes
       a plate-shaped first finger and a plate-shaped second finger arranged so that plate surfaces face each other, as the plurality of fingers, and
       a force-receiving portion that is connected to the second end portion of each of the first finger and the second finger via the tactile sensor unit, and that receives a force from the object being grasped when the object being grasped is grasped by the first finger and the second finger, and
    the force-receiving portion includes
       a grasping surface that is placed facing the object being grasped in a direction intersecting the extending direction to be able to grasp the object being grasped, the grasping surface receiving a force in the direction intersecting the extending direction, and
       a pressing surface that is placed further away from the palm than the second end portion of each of the first finger and the second finger in the extending direction, the pressing surface extending in a direction intersecting the grasping surface and receiving a force in the extending direction.

16. The end effector device according to claim 1, wherein the position shift direction determination unit determines whether the object being grasped is position-shifted with respect to the fitting recess by using only external forces in three axial directions among the at least three axial directions.

17. The end effector device according to claim 16, wherein
the end effector includes
a plate-shaped first finger and a plate-shaped second finger arranged so that plate surfaces face each other, as the plurality of fingers, and
a force-receiving portion that is connected to the second end portion of each of the first finger and the second finger via the tactile sensor unit, and that receives a force from the object being grasped when the object being grasped is grasped by the first finger and the second finger, and
the force-receiving portion includes
a grasping surface that is placed facing the object being grasped in a direction intersecting the extending direction to be able to grasp the object being grasped, the grasping surface receiving a force in the direction intersecting the extending direction, and
a pressing surface that is placed further away from the palm than the second end portion of each of the first finger and the second finger in the extending direction, the pressing surface extending in a direction intersecting the grasping surface and receiving a force in the extending direction.

18. The end effector device according to claim 1, wherein
the end effector includes
a plate-shaped first finger and a plate-shaped second finger arranged so that plate surfaces face each other, as the plurality of fingers, and
a force-receiving portion that is connected to the second end portion of each of the first finger and the second finger via the tactile sensor unit, and that receives a force from the object being grasped when the object being grasped is grasped by the first finger and the second finger, and
the force-receiving portion includes
a grasping surface that is placed facing the object being grasped in a direction intersecting the extending direction to be able to grasp the object being grasped, the grasping surface receiving a force in the direction intersecting the extending direction, and
a pressing surface that is placed further away from the palm than the second end portion of each of the first finger and the second finger in the extending direction, the pressing surface extending in a direction intersecting the grasping surface and receiving a force in the extending direction.

* * * * *